(12) United States Patent
Roth

(10) Patent No.: US 7,395,078 B2
(45) Date of Patent: Jul. 1, 2008

(54) VOICE OVER SHORT MESSAGE SERVICE

(75) Inventor: Daniel L. Roth, Boston, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 0 days.

(21) Appl. No.: 11/110,371

(22) Filed: Apr. 20, 2005

(65) Prior Publication Data

US 2005/0266831 A1 Dec. 1, 2005

Related U.S. Application Data

(60) Provisional application No. 60/563,754, filed on Apr. 20, 2004.

(51) Int. Cl.
*H04Q 7/20* (2006.01)
(52) U.S. Cl. ............... 455/466; 455/418; 455/550.1; 704/204; 704/224
(58) Field of Classification Search ............ 455/466, 455/412.1, 550.1, 414.4, 418; 704/201, 236, 704/260, 204, 224
See application file for complete search history.

(56) References Cited

U.S. PATENT DOCUMENTS

| | | | |
|---|---|---|---|
| 6,163,765 A * | 12/2000 | Andric et al. ............ | 704/204 |
| 6,760,703 B2 * | 7/2004 | Kagoshima et al. ....... | 704/262 |
| 2002/0077811 A1 * | 6/2002 | Koenig et al. ............ | 704/201 |
| 2002/0102966 A1 * | 8/2002 | Lev et al. ................. | 455/412 |
| 2002/0103646 A1 * | 8/2002 | Kochanski et al. ........ | 704/260 |
| 2002/0142787 A1 * | 10/2002 | Holley et al. ............. | 455/466 |
| 2003/0014253 A1 | 1/2003 | Walsh | |
| 2003/0088418 A1 | 5/2003 | Kagoshima et al. | |
| 2003/0139922 A1 * | 7/2003 | Hoffman et al. ........... | 704/201 |

OTHER PUBLICATIONS

Masurko, T. et al., "A Very Low Bit Rate Speech Coder Using HMM with Speaker Adaption", Ministry of Education, Science and Culture of Japan, Grant-in-Aid for Encouragement of Young Scientists, 09750399, 1997, 4 pages.
Pagarkar, M. H. et al., "Language Independent Speech Compression Using Devanagari Phonetics," V.E.S. Institute of Technology, Dec. 1, 2003, 7 pages.
International Searching Authority, International Search Report for PCT/US05/13478, mailed Mar. 28, 2007, 4 pages.

* cited by examiner

*Primary Examiner*—Danh Le
(74) *Attorney, Agent, or Firm*—Wilmer Cutler Pickering Hale and Dorr LLP

(57) ABSTRACT

A method of sending a voice message via a mobile communication device, said method involving: receiving an utterance from a user of the mobile communication device; generating a non-text representation of the received utterance; inserting the non-text representation into a body of a text message; and sending the text message over a wireless messaging channel from the mobile communication device to a recipient's device.

17 Claims, 3 Drawing Sheets

VOICE OVER SHORT MESSAGE SERVICE

This application claims the benefit of U.S. Provisional Patent Application Ser. No. 60/563,754, filed Apr. 20, 2004, the entire contents of which are incorporated herein by reference.

TECHNICAL FIELD

This invention generally relates to conveying voice messages over communications channels that are available on a mobile communication devices, e.g. cellular phones.

BACKGROUND OF THE INVENTION

To minimize the amount of voice information transmitted over a wireless communication network, and thus maximize the number of phone calls supportable on the network at any one time, cellular phones utilize voice coders/decoders, or codecs. Codecs remove much of the redundant or unnecessary information from a speech signal. Then the fundamental elements of the speech are transmitted over the network to a receiving cellular phone where they are decoded, or recombined with data that resembles the previously removed information. This results in reconstituted speech that can be recognized by the end user. The codecs must balance the need for minimal data transmission with the need to retain enough of the original speech information to sound natural when decoded on the receiving end. In general voice codecs today can compress speech signals to between 4.5 k-8 k bits per second, with 2.4 k bits per second being roughly the minimal rate required to maintain natural-sounding speech. Despite the ability to compress speech to these low bit rates, the network infrastructure for handling large volumes of voice calls is limited in many markets, particularly in emerging markets in developing countries. This can make the cost of a wireless phone call there significant.

An alternate and increasingly popular method of communicating via cellular phones is text messaging. In response to the high costs of voice calls, text based mobile-to-mobile messaging called SMS, or Short Message Service, has become heavily used in some markets, particularly amongst younger demographics. SMS enables a user to transmit and receive short text messages at any time, regardless of whether a voice call is in progress. The user typically types in the message text through the small keyboard that is provided on the device. The messages are hardware limited to 160 characters, and are sent as packets through a low bandwidth, out-of-band message transfer channel. This allows for facile communication with minimal burden on the wireless network.

Most legacy wireless network systems such as GSM, TDMA, and CDMA have a text/data channel capable of sending and receiving SMS, so the infrastructure for this service already exists even in emerging markets in developing countries. Some estimates now place the global number of SMS messages at nearly 40 billion messages per month. It is thought that SMS is now the most significant source of non-voice based revenue to wireless network operators worldwide. As a result carriers are very interested in promoting the use of SMS. Indeed, network operators in developing markets may limit the implementation of more advanced voice network infrastructures due to the large revenues associated with text messaging.

SUMMARY OF THE INVENTION

In some markets the cost of cell phone calls is relatively expensive, making text messaging (e.g. via SMS) a desirable communication alternative. However, in a portion of those markets other barriers may exist to using text. Both the sender and the receive must be able to read and/or write. But in emerging markets, such as India which has a very large population, the adult literacy rate is roughly 60% and thus a large number of people are not sufficiently literate to type text messages into the cell phone. Thus, for many consumers in such markets who can neither compose nor read a message, SMS text-messaging as a communication mode is not an effective alternative. At least some of the embodiments described herein provide a mechanism by which such consumers can nevertheless use the lower-cost, non-voice wireless communication channels for verbal communications instead of text messaging.

In general, in one aspect, the invention features a method of sending a voice message via a mobile communication device. The method involves: receiving an utterance from a user of the mobile communication device; generating a non-text representation of the received utterance; inserting the non-text representation into a body of a text message; and sending the text message over a wireless messaging channel from the mobile communication device to a recipient's device.

Embodiments include one or more of the following features. The mobile communication device is a cellular phone. Generating the non-text representation of the received utterance involves performing recognition on a signal derived from the received utterance to generate a string of symbols, wherein the string of symbols is the non-text representation. The symbols in the string of symbols are selected from the group consisting of phonemes, diphones, and triphones (more specifically, the symbols are phonemes). The wireless messaging channel is an SMS channel and the text message is an SMS message. The method also involves including an indicator with the text message identifying the text message as containing a non-text representation of the utterance. The non-text representation is a compressed version of the received utterance.

In general, in another aspect, the invention features a method of receiving on a mobile communication device a message representing an utterance. The method involves: over a wireless messaging channel receiving a text message, wherein the text message contains a non-text representation of the utterance; extracting the non-text representation from the text message; synthesizing an audio representation of the spoken utterance from the non-text representation; and playing the synthesized audio representation through an audio output device on the mobile communication device.

Embodiments include one or more of the following features. The mobile communication device is a cellular phone. The non-text representation of the utterance is a string of symbols representing sounds of the utterance. The symbols in the string of symbols are selected from the group consisting of phonemes, diphones, and triphones (more specifically, they are phonemes). The wireless messaging channel is an SMS channel and the text message is an SMS message. The received text message includes an indicator identifying the text message as containing a non-text representation of the utterance. The non-text representation is a compressed version of the utterance.

In general, in still another aspect, the invention features a mobile communication device for sending a voice message. The mobile communication device includes: a processor system; a microphone for receiving an utterance from a user of the mobile communication device; a transceiver; and memory storing code which when executed on the processor system causes the mobile communication device to: generate a non-text representation of the received utterance; insert the non-text representation into a body of a text message; and send the text message via the transceiver over a wireless messaging channel from the mobile communication device to a recipient's device.

In general, in still another aspect, the invention features a mobile communication device for receiving a voice message. The mobile communication device includes: a processor system; a transceiver for receiving a text message that contains a non-text representation of an utterance; an audio output device; and memory storing code which when executed on the processor system causes the mobile communication device to: extract the non-text representation from the received text message; synthesize an audio representation of the spoken utterance from the non-text representation; and play the synthesized audio representation through the audio output device.

The details of one or more embodiments of the invention are set forth in the accompanying drawings and the description below. Other features, objects, and advantages of the invention will be apparent from the description and drawings, and from the claims.

DETAILED DESCRIPTION

The described embodiment is a method of sending and receiving spoken or audio information over the SMS network available in cellular phones. A user speaks a desired message, or utterance, into a cellular phone. A phonetic recognition algorithm in the phone then generates a non-text representation of the utterance. An SMS application in the phone sends this non-text representation in the body of an SMS message via the SMS network to the recipient's phone. At the recipient's phone, another SMS application extracts the non-text representation from the body of the SMS message. Then, a synthesizer synthesizes an audio message from the non-text representation and plays the synthesized message to the recipient.

Figure 1:
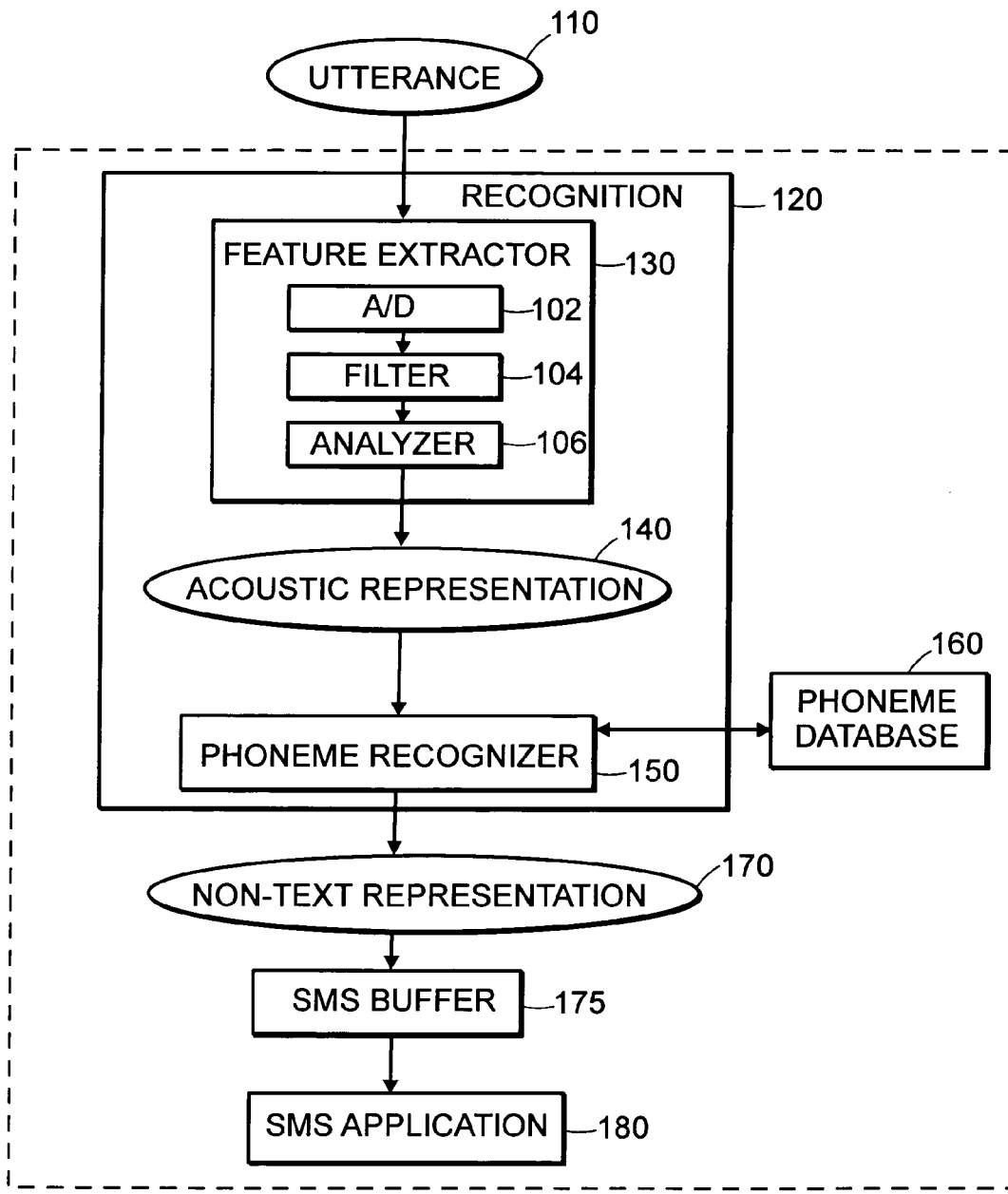
FIG. 1 shows a block diagram of the phonetic recognition system.

FIG. 1 shows a high-level block diagram illustrating in greater detail the functionality that is implemented. A user speaks an utterance 110 into the cellular phone 100 and a feature extractor 130 in the front end of a recognition engine 120 within the phone processes that utterance to extract its acoustic features. Typically, feature extractor 130 includes a digitizer 102 that converts the received analog signal into a digital representation. Digitizer 102 divides the input signal into a sequence of overlapping frames and then outputs a digital representation of the signal within each of the frames. A filter 104 then filters the spectrum of the signal to, among other things, reduce the influence of non-speech noise on the speech signal and to correct for various impairments caused by the spectral characteristics of the channel over which the utterance was received. The filtering process preserves the main verbal content of the utterance while eliminating various frequencies, e.g. the very high and very low frequencies, that likely do not carry significant usable information. An analyzer 106 analyzes the filtered digital signal to extract the relevant acoustic features of the frames, i.e., the feature vector. The output of feature extractor 130 is an acoustic representation 140 of the received utterance. In the described embodiment, feature extractor 130 uses the MEL cepstrum coding technique to extract the relevant features.

In a database 160 in memory, the phone stores a set of phonemes, which are basic phonetic units from which the sounds of the spoken language are constructed. It also stores an acoustic model for each of the phonemes and an index or pointer which identifies the phoneme. The acoustic model is statistical in nature and indicates the probability that a particular phoneme was spoken given the occurrence of a particular set of acoustic features.

In the described embodiment, the recognition engine 120 employs an unconstrained phoneme recognizer 150 to determine the sequence of phonemes (i.e., phoneme string) that is most likely given the sequence of feature vectors which characterizes the user's utterance. The recognizer 150 is unconstrained in that it considers each candidate phoneme with equal weight, without presumption as to the order or to the language spoken by the user. In other words, phoneme recognizer 150 is a relatively crude recognizer that does not use a language model which enables it to identify the spoken words.

Recognizer 150 statistically compares the acoustic representation of the utterance to acoustic representations of phonemes stored in a phoneme database 160 on the cell phone. Phoneme database 160 contains a sufficiently large set of phonemes, with their acoustic representation, to effectively describe the sounds that are found in the language of the user. The phoneme recognizer 150 performs a statistical comparison of the acoustic representations of the received utterance with the acoustic representations of the phonemes to identify the best match. It does this using a well-known technique referred to as hidden Markov model (HMM), though other statistical or non-statistical techniques or models that compare features of speech to stored phonetic units could also be used.

Phoneme recognizer 150 outputs the recognized sequence of phonemes as a sequence of indices or pointers into its database of phonemes. That is, for each phoneme in the recognized string of phonemes, phoneme recognizer 150 looks up in its database phonemes the particular index or pointer that identifies that phoneme and it outputs that index or pointer. The output is a non-text representation of the spoken utterance, in this case, a phoneme string. The value of this string is that a synthesizer on the receiving end of the communication link can recreate the sequence of sounds that made up the utterance, i.e., it can recreate the utterance so that it would generally be recognizable to the user on the other end. Typically, however, the phoneme string will not be easily readable as text since word recognition is not performed.

Phoneme recognizer 150 stores the phoneme string in a buffer 175 for an SMS application 180 that is also running on the cell phone. SMS application 180 generates a text message shell for receiving the non-text representation and populates its address field with the address of the recipient's phone. When buffer 175 is full or the utterance is complete, SMS application 180 inserts the stored phoneme string into the body of an SMS message, along with a flag identifying the message as containing a non-text phoneme string that is intended for a synthesizer on the receiving end. In effect, the flag alerts the SMS application on the other end to not treat the contents of the SMS as a text message that would normally be displayed to the user. SMS application 180 then wirelessly transmits the SMS message over the SMS channel to the recipient's cell phone.

Phoneme recognizer 150 also stores other information in SMS buffer 175 which is useful in improving the quality and/or understandability of the sounds that are synthesized by the recipient's cell phone. For example, it also specifies the temporal length of each phoneme, its volume, and possibly other parameters which can be used to control the quality of the sounds generated by the synthesizer in the receiving phone. In the described embodiment, since phoneme recognizer 150 also recognizes pauses, it truncates those recognized pauses to conserve the space required to represent the utterance.

With the phonetic recognition algorithm, utterance 110 would typically be compressed into a non-text representation 170 at a rate of approximately 200-700 bits per second or less. When sent over the SMS network, which in many areas has a single-message information limit of 1200 bits, this corresponds to an utterance that is about 10 seconds long upon playback on the receiving cell phone.

Note that an alternative to the approach described above would be to perform full speech recognition on the utterance and send the recognized text message in the body of the SMS message. This, however, requires that a full capability recognizer be present on the phone with a lexicon containing a dictionary of words of the type that would be spoken by the consumers to whom such a phone would be sold. That might not be practical, especially if the phone is intended for sale in a market like India, where there are over 350 different languages. The algorithms required to perform speech recognition in such an environment would be very sophisticated and complex; moreover, the resources required to perform that speech recognition would typically be beyond those that would be available on the inexpensive cell phones intended to be sold to the general population. On the other hand, a recognizer that needs to only generate a phonetic string representation of what was spoken, as opposed to the recognized text, is much less complex to build and requires significantly less onboard computational and memory resources. In addition, that set of phonemes required to support phoneme recognition is small, especially in comparison to the lexicon of words that would be necessary to perform full speech recognition. Indeed, using the universal phoneme set would enable the recognizer to handle most languages for the purposes described herein.

It should also be noted that when the phonetic recognizer 150 statistically matches segments of the acoustic representation of the utterance 170 to acoustic representations of the phonemes, the best-match phonemes might occasionally incorrectly match the utterance. For example the recognizer might interpret a "d" sound to be a "t," because the features obtained by the feature extractor 130 are similar for both sounds, making neither sound a significantly better match than the other in the phonetic recognizer 150. Such errors would have a more detrimental effect on speech-to-text recognition but would typically have far less detrimental effect in the applications described herein. To someone listening to the synthesized audio message, the presence of such errors in the phonetic string that is being synthesized are not likely to render the playback unintelligible. Indeed, they might not even be noticed.

Figure 2:
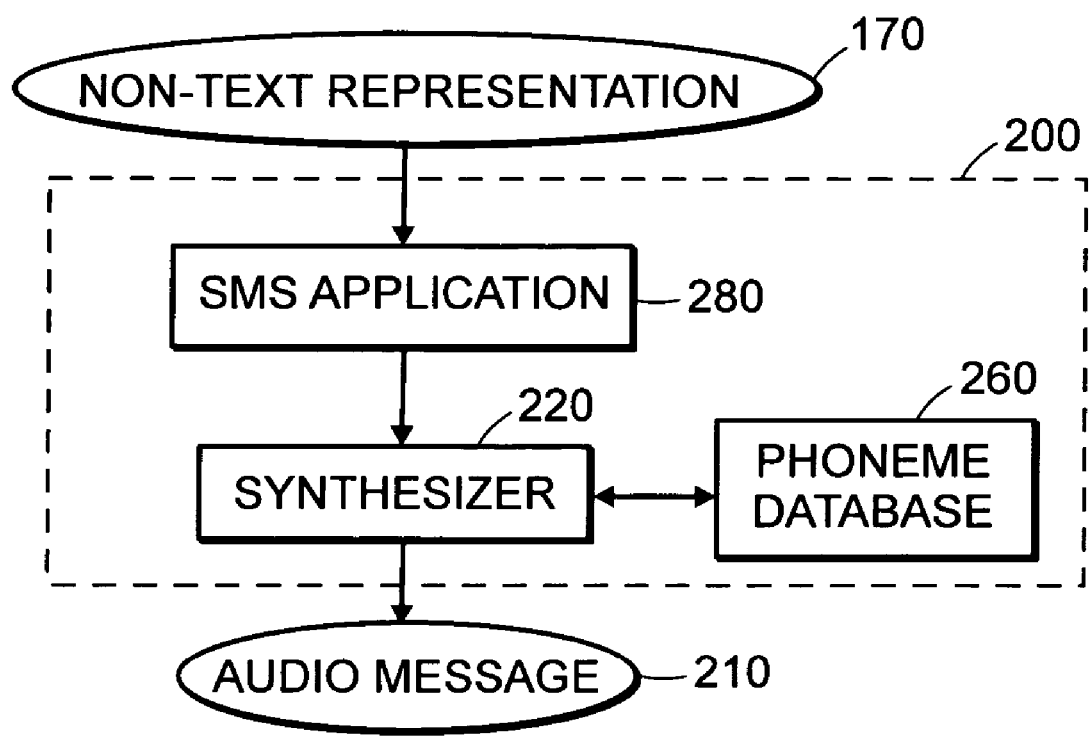
FIG. 2 shows a block diagram of the phonetic synthesis system

FIG. 2 shows a high-level block diagram illustrating the functionality implemented on the receiver side of the SMS channel. A cellular phone 200 operated by the recipient receives the SMS message containing the non-text representation of the utterance and an SMS application 280 processes the message for presentation to the user. A flag within the received SMS message identifies the contents of the SMS message as a phonetic string that must be processed by the synthesizer to generate an audio signal. In other words, the flag causes the SMS application to process the message differently from a normal text message for which the contents of the message would simply be displayed to the user. SMS application 280 passes the phonetic string to a synthesizer 220 within the cell phone, along with any stored parameters which were supplied to control synthesizer 220 and the way it generates the sounds. The recipient's cell phone, like the sender's cell phone, also contains a database of phonemes along with their acoustic representations. The indices or pointers that make up the received phonetic string identify which phonemes from that database are to be synthesized to render the phonetic sting into an audio message. The synthesizer plays through the cell phone speaker the sequence of sounds that represent the phonetic string. In this way, the spoken utterance is transmitted to the recipient via the SMS message facility in non-real time.

If appropriate, it is possible to program the SMS application to generate a sequence of multiple SMS messages to handle longer utterances for which the non-text representation will not fit into the body of a single message. In essence, the SMS application would "packetize" the phonetic string and send multiple SMS messages (or packets) to the recipient's cell phone, each message containing a part of the total utterance. Each message would be indexed or tagged so that the SMS on the recipient's side could accurately reconstruct the complete representation of the utterance. The SMS application on the recipient's side of the connection would also need to be programmed to recognize that the received non-text representation is to be constructed by concatenating the contents of more than one SMS message.

In the embodiments described above, the units of speech used to represent the utterance are phonemes. However, any one of a variety of other symbol sets, other than phonemes, could be used. For example, the symbols could be diphones, triphones, syllables, demisyllables, or any other set that serves to effectively represent the sounds contained within the spoken utterances of the intended users.

For an implementation that is targeted for a specific market, a "tailored" dictionary of phonetic units selected to optimally represent the sounds of the language used in that market could be incorporated in the device. Alternatively, a universal set of phonemes could be used which would enable the phone to recognize and represent most languages.

As noted above, the phoneme recognizer does not include a full language model and indeed might not include any language model at all. Its function is to simply recognize the sounds within the utterance. For this purpose, it is not necessary to recognize their meaning. And thus the resulting representation that is produced by the recognizer is a non-text representation which likely is not readable by the user. That does not mean, however, that the selected symbol set might not include words among the set of symbols. Short, single syllabic words might, for example, appear as symbols or units among the selected set of symbols.

In effect, the phonetic recognition algorithm generates a compressed version of the spoken utterance. In the described embodiment, that compressed version is a non-text representation (i.e., a phonetic string). In fact, other algorithms could be used which simply perform compression without performing any recognition. For example, instead of using a phoneme recognizer, a vocoder could be used to generate the compressed representation and then that compressed representation would be inserted into the body of the SMS message. In other words, any algorithm that produces a non-text representation suitable for sending over SMS or another non-voice channel could be employed. It would be desirable that the selected algorithm be able to compress speech sufficiently so that it is possible to send an utterance that is long enough to convey meaningful information. On the receiving end, the appropriate decompression algorithm would need to be implemented to reconstruct the audio version of the spoken utterance.

Various features can be added to the system to enhance usability. As indicated above, one such feature is to give the sending user the option of choosing a "voice" in which the receiving phone will replay the audio message to the receiving user. This feature is implemented by adding an additional string of characters representing "voice" parameters to the non-text representation of the utterance, which gives instructions to the synthesis algorithm. The user can select and/or adjust these parameters through a menu driven interface on the phone. These parameters would be used to tailor the synthesizer algorithm to produce the desired effect. In the same way, parameters can be included for playback speed, or other modifications to the audio message that make it sound more natural, or more representative of the sending user. Another feature that can be implemented in the system is audio prompted guidance to both the sending and receiving users, which can better enable non-literate users to operate the system. In this case, both phones store a number of prerecorded messages such as "please record after the beep," "enter the phone number of the person you want to send this to," and so on. The phone audibly plays an appropriate message in response to user input.

Another feature that can be implemented in the system is to allow the user to prioritize between the utterance length and quality of reproduction. In this case, the phone would store multiple algorithms that allow for varying length and quality of the non-text representation of the utterance. Before the user records the utterance, the phone offers a length/quality choice to the user. The user inputs his response either verbally or via the phone keypad; then the phone uses the algorithm corresponding to the user instruction to process the utterance. The phone then adds a series of characters giving instruction to the receiving phone on how to synthesize the message from the non-text representation of the utterance.

Figure 3:
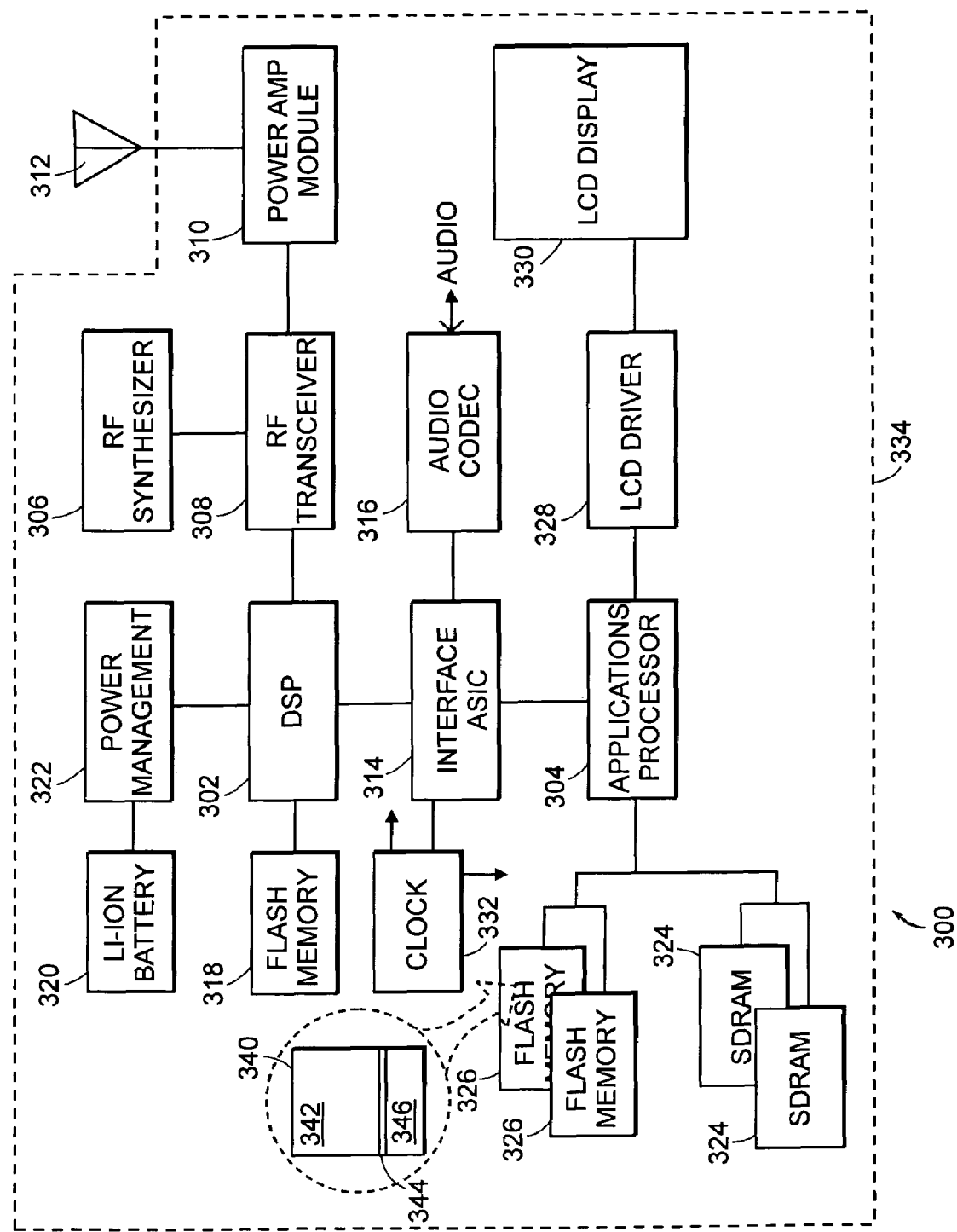
FIG. 3 shows a high-level block diagram of a smartphone incorporating phonetic recognition and synthesis systems.

In the described embodiment, the cellular phone is a smartphone 300, such as is illustrated by the high-level functional block diagram of FIG. 3. Smartphone 300 is a Microsoft PocketPC-powered phone which includes at its core a baseband DSP 302 (digital signal processor) for handling the cellular communication functions (including for example voiceband and channel coding functions) and an applications processor 304 (e.g. Intel StrongArm SA-1110) on which the PocketPC operating system runs. The phone supports GSM voice calls, SMS (Short Messaging Service) text messaging, wireless email, and desktop-like web browsing along with more traditional PDA features.

The transmit and receive functions are implemented by an RF synthesizer 306 and an RF radio transceiver 308 followed by a power amplifier module 310 that handles the final-stage RF transmit duties through an antenna 312. An interface ASIC (application-specific integrated circuit) 314 and an audio CODEC 316 provide interfaces to a speaker, a microphone, and other input/output devices provided in the phone such as a numeric or alphanumeric keypad (not shown) for entering commands and information. DSP 302 uses a flash memory 318 for code store. A Li-Ion (lithium-ion) battery 320 powers the phone and a power management module 322 coupled to DSP 302 manages power consumption within the phone. Volatile and non-volatile memory for applications processor 114 is provided in the form of SDRAM 324 and flash memory 326, respectively. This arrangement of memory is used to hold the code for the operating system, the code for customizable features such as the phone directory, and the code for any applications software that might be included in the smartphone, including the phonetic recognition, synthesizer, and SMS application code mentioned above. It also stores the phoneme database, which includes the phonemes, acoustic representations of the phonemes, and symbols representing the phonemes.

The visual display device for the smartphone includes an LCD driver chip 328 that drives an LCD display 330. There is also a clock module 332 that provides the clock signals for the other devices within the phone and provides an indicator of real time.

All of the above-described components are packaged within an appropriately designed housing 334. Since the smartphone described above is representative of the general internal structure of a number of different commercially available phones and since the internal circuit design of those phones is generally known to persons of ordinary skill in this art, further details about the components shown in FIG. 3 and their operation are not being provided and are not necessary to understanding the invention.

In general, the device would not have to be a cellular phone at all, but would possess the functionality of receiving an utterance, converting it to a non-text representation of the utterance, and sending it over SMS or another non-voice channel. For example a laptop computer having a microphone, appropriate software to generate a non-text representation of an utterance, and a wireless transmitter that utilizes the SMS protocol and frequencies, or any other device with similar functionality, could also be implemented.

While the SMS network is presented in the above example, any network over which one might send text, data and/or media other than voice could be used. As an example one would also use an MMS (Multi-Media Service) messaging channel.

Also, the MEL cepstrum coding technique mentioned above is just one example of many known alternatives for extracting and representing features of the received utterance. Any of the other known techniques, such as LPC cepstral coefficients for example, could be employed instead of the MEL cepstrum coding technique. Two examples of coding techniques that could be used to generate the non-text representations are: (1) Takashi Masuko, Keiichi Tokuda, Takao Kobayashi, "A Very Low Bit Rate Speech Coder Using HMM with Speaker Adaptations," paper presented at the 1998 ICASSP and a version also appearing in Systems and Computers in Japan, Volume 32, Issue 12, 2001. Pages 38-46; and (2) M. Habibullah Pagarkar, Lakshmi Gopalakrishnan, Nimish Sheth, Rizwana Shaikh, Virag Shah, "Language Independent Speech Compression Using Devanagari Phonetics," found on the web at the following URL: http://www.geocities.com/virag81/docs.html, both of which are incorporated herein by reference.

Other aspects, modifications, and embodiments are within the scope of the following claims.

What is claimed is:

1. A method of sending a voice message via a mobile communication device, said method comprising:
    receiving an utterance from a user of the mobile communication device;
    generating a non-text representation of the received utterance;
    inserting at least some of the non-text representation into a body of a text message; and
    sending the text message including the at least some of the non-text representation over a wireless messaging channel from the mobile communication device to a recipient's device.

2. The method of claim 1, wherein the mobile communication device is a cellular phone.

3. The method of claim 1, wherein inserting at least some of the non-text representation involves inserting all of the non-text representation into the body of the text message.

4. The method of claim 1, wherein generating the non-text representation of the received utterance involves performing recognition on a signal derived from the received utterance to generate a string of symbols, wherein the string of symbols is the non-text representation.

5. The method of claim 4, wherein the symbols in the string of symbols are selected from the group consisting of phonemes, diphones, triphones, syllables, and demisyllables.

6. The method of claim 4, wherein the recognition is phoneme recognition and the symbols in the generated string of symbols are phonemes.

7. The method of claim 1, wherein generating the non-text representation of the received utterance involves performing phoneme recognition on a signal derived from the received utterance to generate a phoneme string, wherein the phoneme string is the non-text representation.

8. The method of claim 1, wherein the wireless messaging channel is an SMS channel and the text message is an SMS message.

9. The method of claim 1, further comprising including an indicator with the text message identifying the text message as containing a non-text representation of the utterance.

10. The method of claim 1, wherein the non-text representation is a compressed version of the received utterance.

11. The method of claim 1, further comprising dividing the non-text representation into sections and inserting each section into a body of a different corresponding text message of a plurality of text messages, wherein the first-mentioned text message is one of said plurality of text messages and further comprising sending the plurality of text messages over the wireless messaging channel from the mobile communication device to the recipient's device.

12. A mobile communication device for sending a voice message, said mobile communication device comprising:
   a processor system;
   a microphone for receiving an utterance from a user of the mobile communication device;
   a transceiver; and
   memory storing code which when executed on the processor system causes the mobile communication device to:
      generate a non-text representation of the received utterance;
      insert the non-text representation into a body of a text message; and
      send the text message including the non-text representation via the transceiver over a wireless messaging channel from the mobile communication device to a recipient's device.

13. The mobile communication device of claim 12, wherein generating the non-text representation of the received utterance involves performing recognition on a signal derived from the received utterance to generate a string of symbols, the string of symbols being the non-text representation.

14. The mobile communication device of claim 13, wherein the symbols in the string of symbols are selected from the group consisting of phonemes, diphones, triphones, syllables, and demisyllables.

15. The mobile communication device of claim 12, wherein the wireless messaging channel is an SMS channel and the text message is an SMS message.

16. The mobile communication device of claim 12, wherein the non-text representation is a compressed version of the received utterance.

17. The mobile communication device of claim 12, wherein the code when executed on the processor further causes the mobile communication device to:
   divide the non-text representation into sections;
   insert each section into a body of a different corresponding text message of a plurality of text messages, wherein the first-mentioned text message is one of said plurality of text messages; and
   send the plurality of text messages over the wireless messaging channel from the mobile communication device to the recipient's device.

* * * * *